Feb. 6, 1934. M. FRÄNKL 1,945,634
PROCESS OF SEPARATING GAS MIXTURES
Filed April 11, 1930
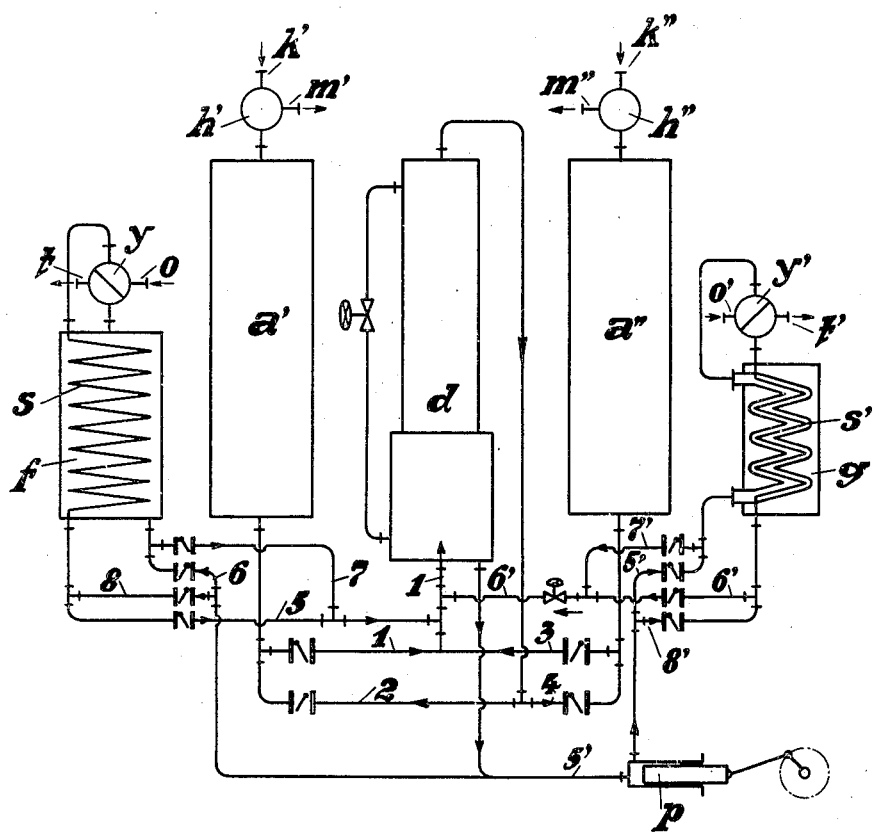
Inventor:
MATHIAS FRÄNKL Patented Feb. 6, 1934

1,945,634

UNITED STATES PATENT OFFICE 1,945,634

PROCESS OF SEPARATING GAS MIXTURES

Mathias Fränkl, Augsburg, Germany, assignor to American Oxythermic Corporation, New York, N. Y., a corporation of Delaware Application April 11, 1930, Serial No. 443,480, and in Germany April 19, 1929

5 Claims. (Cl. 183—115)

The invention relates to a process for the resolution of gas mixtures into their component parts and, more particularly, to a process for the separation of air into nitrogen and oxygen.

The usefulness of a process for the separation of gas mixtures utilizing cold accumulators with periodically reversed direction of flow for the cold exchange is somewhat impaired by the fact that the products of separation are admixed with the gas mixture present in the cold accumulator at the moment of the reversal of flow, and in consequence are not recovered in a pure state. This circumstance restricts the applicability of the process in all cases where a particularly pure product is required, as for instance in the case of commercial oxygen, even though the undesired admixture amounts only to from 2 to 3 per cent. Furthermore, a simplified apparatus comprising only a single pair of cold accumulators is desirable instead of the two pairs necessary at present (one pair for the gas mixture and a component of lower boiling point, and the other for a component of higher boiling point).

The accumulation of the water vapours and carbonic acid gas contained in the gas mixture, in the shape of hoar frost inside the counter current devices, is a disadvantage in the operation of continuous countercurrent cold exchangers from which cold accumulators with periodically reversed direction of flow are free, because in the latter the hoar frost is taken up by the outgoing gas stream through sublimation. With a view to obviate this fault, tubular countercurrent cold exchangers have recently been fitted with reversing means and one of the products of separation, in periods of a day's duration, is caused to flow through the space, through which previously the gas mixture has flown, and vice versa. In this way it is possible in tubular countercurrent devices also to sublime the hoar frost by a separation product.

An object of the invention is to provide a process of separating gas mixtures employing cold accumulators or regenerators by which a component of higher boiling point, that is oxygen in case of air being the gas mixture to be separated, may be recovered pure.

Another object of the invention is to provide a process for the separation of gas mixtures in which regenerative cooling between a portion of the gas mixture and a separated component is combined with countercurrent cooling of another portion of the gas mixture and a second separated component.

Further, the invention provides a process by which a disadvantageous accumulation of frost in a countercurrent cooling device may be obviated.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

For a fuller understanding of the nature and objects of the invention, reference should be had to the following detailed description taken in connection with the accompanying drawing, in which there is depicted diagrammatically an arrangement and construction of parts adapted to effect the objects of the invention.

In the practice of the invention a process using cold accumulators with periodically reversed direction of flow is combined with a process utilizing continuous countercurrent indirect cold exchange. The apparatus necessary in consequence comprises only two cold accumulators for the gas mixture and the component of lower boiling point, and a tubular counter current cold exchanger for the gas mixture and the component of higher boiling point.

A characteristic feature of the invention is, that cold accumulators with periodically reversed direction of flow for cold exchange solely between a major part of a gas mixture and a lower boiling component are combined with continuous countercurrent cold exchange solely between a minor part of a gas mixture and a higher boiling component. This may be effected either with a high or low pressure compression of the higher boiling component. In both cases the counter current reversing principle is applied, so that the higher boiling separation product may be recovered in a pure state without dispensing entirely with cold accumulators with periodically reversed direction of flow and, at the same time, preventing the accumulation of hoar frost within the counter current device.

The major part of the gas mixture (in case of air, four-fifths) and the whole of the lower boiling component (nitrogen, when separating air) courses, in periodically reversed direction inside the old accumulators $a'$ and $a''$ while the minor part (one-fifth) and the component of higher boiling point (oxygen) courses within continuously operated countercurrent devices $f$ and $g$.

The accompanying drawing shows, schematically, a preferred form of apparatus for carrying out the process. It comprises two cold accumulators $a'$ and $a''$ for the cold exchange of the major part of the gas mixture solely with a lower-boiling component, a separator $d$, a reversible low pressure counter current device $f$ and a high pressure counter current device $g$. Of the counter-current exchangers only one is operating at a time, either the low pressure or the high pressure one.

Through reversing valve $h'$ near point $k'$ the major part of the gas mixture enters into the cold accumulator $a'$, takes up cold from the iron mass packing within the cold accumulator and streams through pipe 1 into the separator $d$, where it is separated into its principal components. The separator $d$ is the usual type of column for the separation of air into nitrogen and oxygen. Air, for example, is liquefied in a condenser in the base, the liquid air conducted to the top; expanded thereinto and therein rectified to produce nitrogen, which is withdrawn from the top and passes through either pipe 4 or pipe 2, and oxygen, which is drawn off from the base of the separator and passes out through either interchanger $f$ or $g$. The component of lower boiling point flows thereupon through pipe 4 and the cold accumulator $a''$ to the reversing valve $h$ and is drawn off near point $m''$ after having imparted its cold to cold accumulator $a''$.

After a few minutes' time reversal is effected and the gas mixture is caused to enter $a''$ near point $k''$ where it picks up the cold which the lower boiling separation product previously imparted to the iron content of the cold accumulator, and flows through pipe 3 into the separator. There it is separated. The lower boiling product then flows through pipe 2 to cold accumulator $a'$ and is drawn off through reversing valve $h'$ near point $m'$, after having imparted its cold content to cold accumulator $a'$.

The minor part of the gas mixture under pressure of from 3 to 4 atm. is introduced at $o$ into the counter current device $f$, where through a spiral tube $s$ it flows from top to bottom and passes through pipe 5, to the separator $d$ wherein it is separated.

The separation product of higher boiling point is, in the liquid state, caused to flow through pipe 6 into the counter current device $f$, is there evaporated, and in the gaseous state flows outside the spiral tube $s$ from bottom to top. It is then drawn off at $t$.

About once every day the path of flow is reversed. For a period of a day the gas mixture is then caused to enter at $o$ and flow through the counter current device outside the spiral tube $s$ from top to bottom, and through pipe 7 into the separator $d$, while the higher boiling product of separation flows from separator $d$ through pipe 8 into the counter current device, and there inside the spiral tube $s$ from bottom to top to be drawn off at $t$.

In all cases where the higher boiling separation product is marketed in steel flasks, in a highly compressed state, as for instance commercial oxygen, instead of the low pressure counter current device a high pressure double tube counter current device $g$ is utilized. The oxygen leaving the separator by pipe 5', in the liquid state, is then forced by a piston pump for liquids $p$ against the high tensioned contents of the steel flasks into the counter current device $g$. At the same time, part of the gas mixture to be separated is compressed to the same degree, caused to enter the counter current device at $o'$ and flow through one of the two tubes of the double tube spiral $s$ from top to bottom. The liquid oxygen evaporates, and the high pressure air liquefies and flows through pipe 6' provided with an expansion valve into the separator.

The operation of this high pressure counter current device is also adapted to be reversed daily, the same as the low pressure counter current device previously described. For this purpose pipes 7' and 8' and a reversing valve $y'$ are provided.

Since certain changes may be made in carrying out the above process without departing from the scope of the invention, it is intended that all matter contained in the above description shall be interpreted as illustrative and not in a limiting sense.

I claim:

1. A process of separating gas mixtures, which comprises transferring heat from a portion of a gas mixture solely to an accumulator, extracting heat from another portion of said gas mixture, separating such cooled portions into a plurality of components, transferring heat from a second accumulator solely to one of said separated components, transferring heat to another of said separated components wholly from said second portion of gas mixture by direct contact exchange with a passage conveying such portion, and rapidly alternating the periods of heat transfer for heat abstraction from said accumulators, the discharge temperature of each component remaining substantially constant at approximately the temperature of the entering gas mixture.

2. The method of separating air utilizing regenerative refrigeration, which comprises conducting approximately four-fifths of the air in heat exchange relation solely with a chilled third body, conducting the remaining portion of the air in continuous countercurrent direct contact heat exchange relation with a passage conveying separated oxygen, separating the cooled air into oxygen and nitrogen, conducting the nitrogen in heat exchange relation solely with a second third body whereby the latter is wholly chilled by the nitrogen, and the oxygen in the said countercurrent heat exchange relation wherein the oxygen is warmed entirely by cold exchange with said remaining portion of air, and then alternating the flow of the said four-fifths of the air and the nitrogen with respect to the said third bodies, so that the said nitrogen flows in heat exchange relation with the first-mentioned third body to chill the latter, while the said four-fifths of the air flows in heat exchange relation with the second mentioned chilled third body, the discharge temperature of the nitrogen and oxygen remaining substantially constant at approximately the temperature of the entering air.

3. A process of separating gas mixtures which comprises cooling a gas mixture, introducing such cooled gas mixture into a separator, separating the mixture into higher and lower boiling output components, and effecting said cooling of a part of the gas mixture solely by a cold exchange with a lower boiling output component by direct contact with a solid regenerative body within a cold accumulator with periodic reversal of flow, and warming a higher boiling output component within a continuously operating countercurrent cold exchange device entirely by cold exchange with another part of the gas mixture whereby said part is cooled, the discharge temperature of each output component remaining substantially constant at approximately the temperature of the entering gas mixture.

4. In a process of separating input gas mixtures into higher and lower boiling output components, the improvement which comprises cooling a part of the gas mixture solely by cold exchange with a lower boiling output component by direct contact with a solid regenerative body within a cold accumulator with periodic reversal of flow, and warming a higher boiling output component within a continuously operating countercurrent cold exchange device wholly by cold exchange with another part of the input gas mixture whereby said part is cooled, the discharge temperature of each output component remaining substantially constant at approximately the temperature of the entering gas mixture.

5. In a process of separating input gas mixtures into higher and lower boiling output components, the improvement which comprises cooling a part of the gas mixture solely by cold exchange with a lower boiling output component by direct contact with a solid regenerative body within a cold accumulator with periodic reversal of flow, warming a higher boiling output component within a continuously operating countercurrent cold exchange device wholly by cold exchange with another part of the input gas mixture whereby said part is cooled, and periodically and simultaneously reversing the paths of flow of the higher boiling output component and the portion of the input gas mixture within the countercurrent cold exchange device.

MATHIAS FRÄNKL.